(12) United States Patent
Lee

(10) Patent No.: US 11,755,033 B2
(45) Date of Patent: Sep. 12, 2023

(54) ARTIFICIAL INTELLIGENCE DEVICE INSTALLED IN VEHICLE AND METHOD THEREFOR

(71) Applicant: LG ELECTRONICS INC., Seoul (KR)

(72) Inventor: Seungjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 16/547,417

(22) Filed: Aug. 21, 2019

(65) Prior Publication Data

US 2019/0377362 A1 Dec. 12, 2019

(30) Foreign Application Priority Data

Jul. 16, 2019 (KR) .................. 10-2019-0086014

(51) Int. Cl.
*G05D 1/00* (2006.01)
*G05D 1/02* (2020.01)
*H04W 4/46* (2018.01)
*H04W 12/63* (2021.01)

(52) U.S. Cl.
CPC ......... *G05D 1/0289* (2013.01); *G05D 1/0088* (2013.01); *G05D 1/0221* (2013.01); *H04W 4/46* (2018.02); *H04W 12/63* (2021.01)

(58) Field of Classification Search
CPC .. G05D 1/0289; G05D 1/0088; G05D 1/0221; H04W 4/46
USPC .......................................................... 701/23
See application file for complete search history.

(56) References Cited

U.S. PATENT DOCUMENTS

| | | | | |
|---|---|---|---|---|
| 9,376,051 | B1* | 6/2016 | McKenna | G08G 1/096791 |
| 10,494,205 | B1* | 12/2019 | Hoofard | G06Q 10/06316 |
| 2015/0039173 | A1* | 2/2015 | Beaurepaire | B62D 15/0285 701/23 |
| 2016/0189435 | A1* | 6/2016 | Beaurepaire | G06Q 30/0208 705/13 |
| 2017/0038777 | A1* | 2/2017 | Harvey | G05D 1/0027 |
| 2017/0329346 | A1* | 11/2017 | Latotzki | B60W 30/06 |
| 2017/0365170 | A1* | 12/2017 | Lazic | G08G 1/143 |
| 2018/0211546 | A1* | 7/2018 | Smartt | G05D 1/0088 |
| 2018/0261092 | A1* | 9/2018 | Tsuyunashi | G08G 1/144 |
| 2020/0086853 | A1* | 3/2020 | Kumar | G05D 1/0088 |

OTHER PUBLICATIONS

Mathew Hooper, "Top five blockchain benefits transforming your industry," Feb. 22, 2018, IBM Supply Chain and Blockchain Blog, whole document. (Year: 2018).*

* cited by examiner

*Primary Examiner* — Tyler J Lee
*Assistant Examiner* — Tiffany P Ohman
(74) *Attorney, Agent, or Firm* — LEE HONG DEGERMAN KANG WAIMEY

(57) ABSTRACT

An artificial intelligence (AI) device installed in a first vehicle includes a sensing unit configured to sense an area in which the first vehicle is moveable at a current position, and a processor configured to receive a request for assignment of control authorization for allowing a first external vehicle to control the first vehicle from the first external vehicle, based on information sensed by the sensing unit, or to make a request to the second external vehicle for assignment of control authorization for allowing the AI device to control a second external vehicle.

8 Claims, 12 Drawing Sheets

ARTIFICIAL INTELLIGENCE DEVICE INSTALLED IN VEHICLE AND METHOD THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0086014, filed on Jul. 16, 2019, the contents of which are hereby incorporated by reference herein in its entirety.

BACKGROUND OF THE INVENTION

Field of the Invention

The present invention relates to an artificial intelligence (AI) device installed in a vehicle and a method therefor, and more particularly, to an AI installed in a vehicle and a method therefor, for sensing an area in which a vehicle is moveable, receiving a request for assignment of control authorization of an external vehicle, and assigning control authorization based on the area or making a request to other external vehicles for assignment of control authorization.

Discussion of the Related Art

In accordance with recent trends, vehicles have applied a traveling assist function of assisting driver manipulation for vehicle traveling or an autonomous function of replacing driver manipulation for vehicle traveling using artificial intelligence (AI) technology. The traveling assist function (or a traveling assist system) may include a cruise control function, a vehicle interval adjusting function, a lane keeping function, or the like. In addition, the autonomous function may be considered to include all traveling assist functions.

A vehicle having such an autonomous function may prevent an accident with other vehicle on a general road or may smoothly carry a passenger to a desired destination.

However, even if a vehicle is capable of autonomously driving, when a plurality of vehicles are densely positioned and most vehicles are stationary like in a parking lot, the vehicle is not frequently capable of escaping from the parking lot unless vehicles are moved with respect to each other.

Accordingly, when there is another autonomous vehicle that hinders a travel path of an autonomous vehicle, traveling of the autonomous vehicle may be largely smoothened by controlling another autonomous vehicle to move and controlling the travel path.

SUMMARY OF THE INVENTION

Accordingly, the present invention is directed to an artificial intelligence (AI) device installed in a vehicle and a method therefor, for sensing an area in which a vehicle is moveable, processing a request for assignment of control authorization of an external vehicle based on the area, and allowing an external vehicle to move to a target position.

The present invention is directed to an AI device and a method therefor, for allowing an external vehicle to move to a target position by making a request to other external vehicles for control authorization when control of other external vehicles is needed, in response to a request for assignment of control authorization of the external vehicle.

The present invention is directed to an AI device and a method therefor, for ensuring a moving space of an external vehicle through serial requests for control authorization for surrounding stationary vehicles when a moving path of external vehicles is blocked by other vehicles in a parking lot in which vehicles are dense.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an artificial intelligence (AI) device installed in a first vehicle includes a sensing unit configured to sense an area in which the first vehicle is moveable at a current position, and a processor configured to receive a request for assignment of control authorization for allowing a first external vehicle to control the first vehicle from the first external vehicle, based on information sensed by the sensing unit, or to make a request to the second external vehicle for assignment of control authorization for allowing the AI device to control a second external vehicle.

The processor may assign the control authorization to the first external vehicle upon determining that the first external vehicle is to collide with the first vehicle at the current position when moving to a target position.

Upon receiving a request for assignment of control authorization for a first range in which the first vehicle needs to move for enabling the first external vehicle to move to the target position without collision with the first vehicle, from the first external vehicle, the processor may perform an operation of comparing the area in which the first vehicle is moveable with the first range, and upon determining that the area in which the first vehicle is moveable is larger than the first range, the processor may perform an operation of assigning the control authorization for the first range to the first external vehicle.

Upon determining that the area in which the first vehicle is moveable is smaller than the first range, the processor may perform an operation of making a request to the second external vehicle for assignment of control authorization for a second range in which the second external vehicle needs to move for enabling the first vehicle to move by the first range without collision with the second external vehicle.

The processor may perform an operation of receiving the assignment of the control authorization from the second external vehicle, controlling the second external vehicle to move by the second range, and assigning the control authorization for the first range to the first external vehicle.

When the first external vehicle moves to the target position, the processor may perform an operation of moving the first vehicle to a start position of the first vehicle at a time point when control by the first external vehicle begins.

When the first vehicle moves to the start position of the first vehicle, the processor may perform an operation of making a request to the second external vehicle for original position movement of moving the second external vehicle to a start position at a time point when control by the first vehicle begins.

In another aspect, a vehicle control method performed by an artificial intelligence (AI) device installed in a first vehicle includes sensing an area in which the first vehicle is moveable at a current position, and receiving a request for assignment of control authorization for allowing a first external vehicle to control the first vehicle from the first external vehicle, based on sensed information, or making a request to the second external vehicle for assignment of control authorization for allowing the AI device to control a second external vehicle.

The receiving the request may include assigning the control authorization to the first external vehicle upon determining that the first external vehicle is to collide with the first vehicle at the current position when moving to a target position.

The receiving the request may include, upon receiving a request for assignment of control authorization for a first range in which the first vehicle needs to move for enabling the first external vehicle to move to the target position without collision with the first vehicle, from the first external vehicle, comparing the area in which the first vehicle is moveable with the first range, and upon determining that the area in which the first vehicle is moveable is larger than the first range, assigning the control authorization for the first range to the first external vehicle.

The receiving the request may include, upon determining that the area in which the first vehicle is moveable is smaller than the first range, making a request to the second external vehicle for assignment of control authorization for a second range in which the second external vehicle needs to move for enabling the first vehicle to move by the first range without collision with the second external vehicle.

The receiving the request may include receiving the assignment of the control authorization from the second external vehicle, controlling the second external vehicle to move by the second range, and assigning the control authorization for the first range to the first external vehicle.

The receiving the request may include, when the first external vehicle moves to the target position, moving the first vehicle to a start position of the first vehicle at a time point when control by the first external vehicle begins.

The receiving the request may include, when the first vehicle moves to the start position of the first vehicle, making a request to the second external vehicle for original position movement of moving the second external vehicle to a start position at a time point when control by the first vehicle begins.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
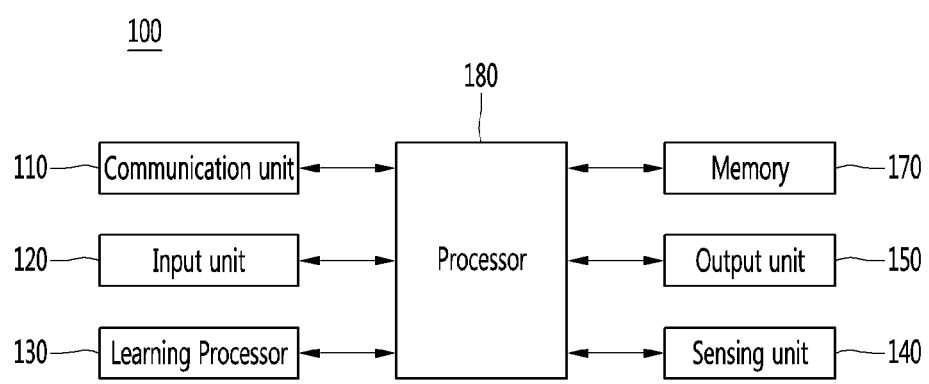
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
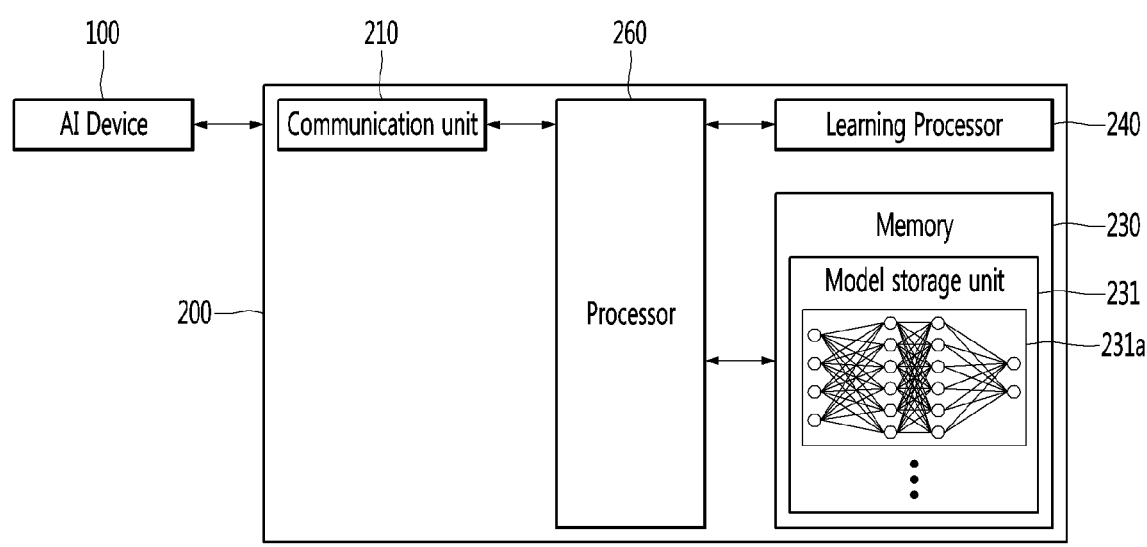
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
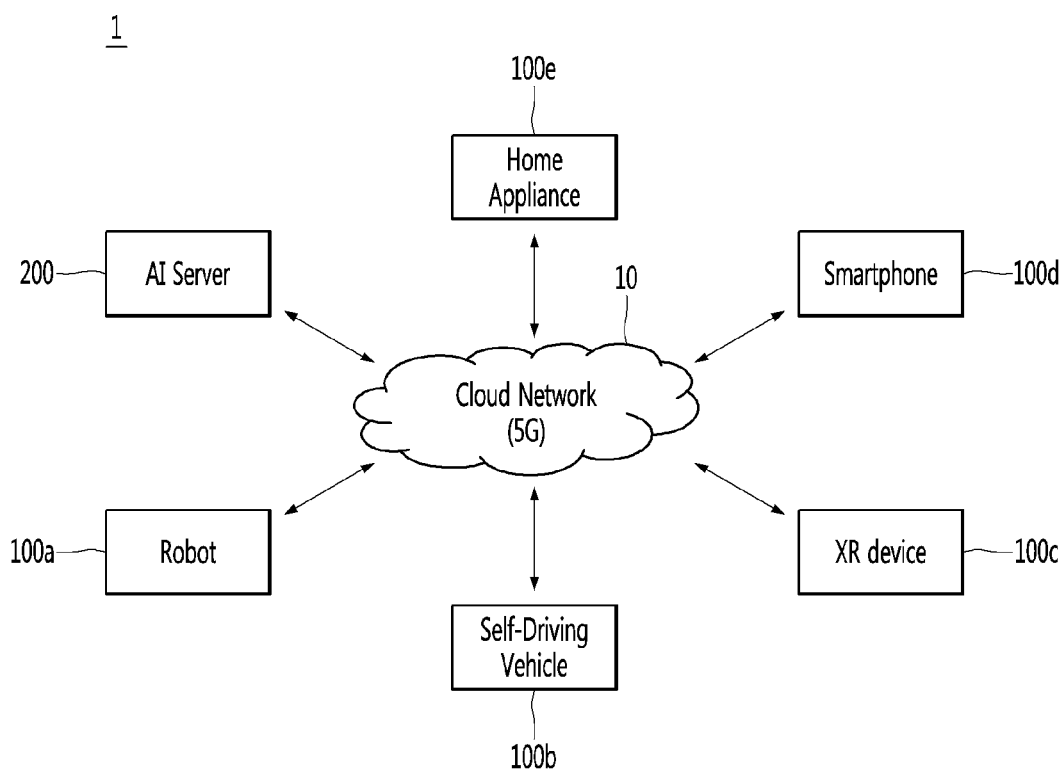
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
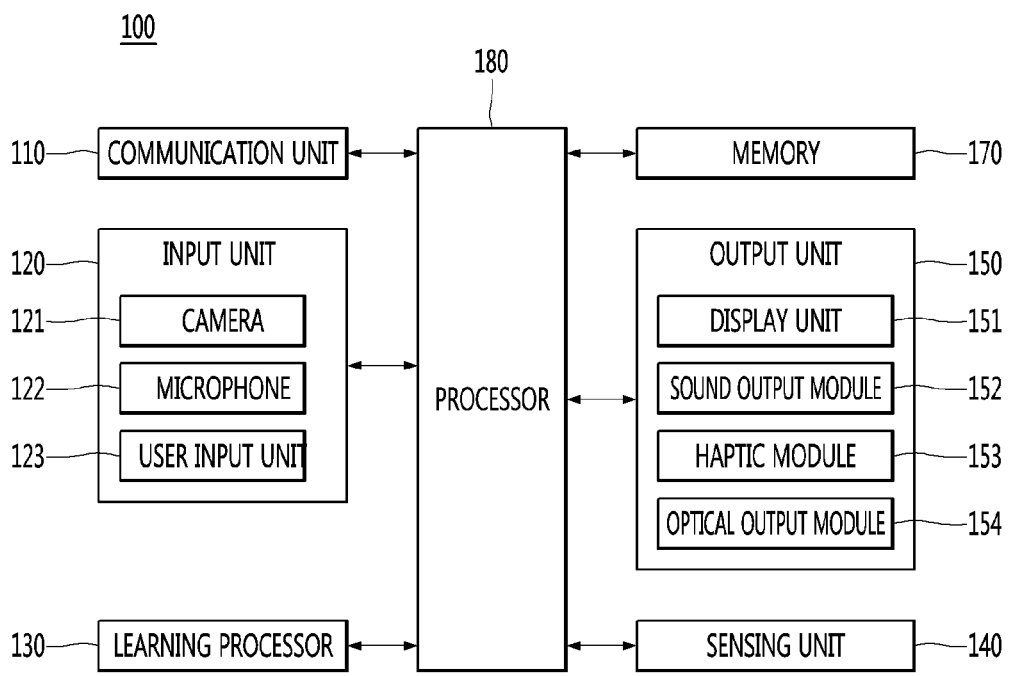
FIG. 4 is a diagram showing the AI device 100 according to an embodiment of the present invention.

FIG. 4 is a diagram showing the AI device 100 according to an embodiment of the present invention.

With regard to a description of FIG. 4, a repeated description of FIG. 1 is omitted.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output unit 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

In this case, the optical output module 154 may include various light sources such as an LED or a laser and may be referred to as lighting.

In this case, the optical output module 154 may include a driving unit for adjusting the size and direction of the lighting that emits lights or may be connected to the driving unit.

In this case, the optical output module 154 may include a projector and may project light to output an image.

Figure 5:
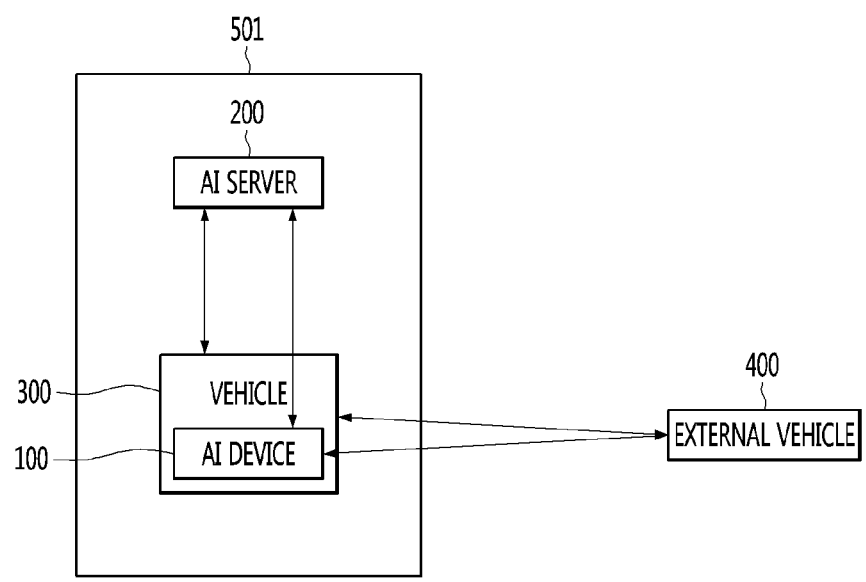
FIGS. 5 and 6 are diagrams showing an AI system according to an embodiment of the present invention.
Figure 6:
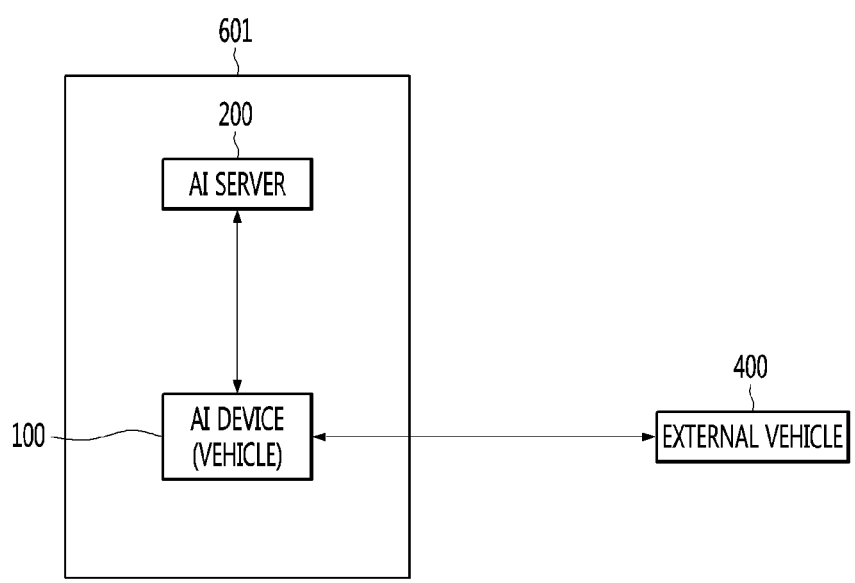

FIGS. 5 and 6 are diagrams showing an AI system according to an embodiment of the present invention.

Referring to FIGS. 5 and 6, an AI system 501 or 601 that processes assignment of control authorization according to an embodiment of the present invention may include at least one of the AI device 100, the AI server 200, or a vehicle 300.

The AI system 501 of FIG. 5 may be configured in such a way that the AI device 100 and the vehicle 300 are distinguished from each other and the AI device 100 is installed in the vehicle 300. That is, the AI device 100 for providing notification related to lane change may be installed in a general vehicle or a vehicle having an AI function.

In this case, the AI device 100 may be modular and may be installed in the vehicle 300.

The AI system 601 of FIG. 6 may be configured in such a way that the AI device 100 and a vehicle are configured as one component, and a vehicle having an AI function may be referred to as the AI device 100.

That is, the vehicle according to the present invention may refer to a vehicle that is a control target of the AI device 100 or a target to which a function is provided.

The AI device 100, the AI server 200, and the vehicle 300 may communicate with each other via wired and wireless communication technology.

In this case, the devices 100, 200, and 300 may communicate with each other thorough a base station, a router, or the like, but may directly communicate with each other using short-distance communication technology or the like.

For example, the devices 100, 200, and 300 may directly communicate with each other using 5th generation (5G) communication.

The AI device 100 and the vehicle 300 may communicate with an external vehicle 400 via wired and wireless communication technology.

In this case, the AI device 100 and the vehicle 300 may communicate with the external vehicle 400 according to vehicle to vehicle (V2V) or vehicle to everything (V2X).

In this case, the AI device 100 and the vehicle 300 may communicate with the external vehicle 400 through a base station using 5G communication or may directly communicate with the external vehicle 400.

The external vehicle 400 may include a plurality of external vehicles 401, 402, and 403.

Here, the vehicle may be a target controlled by the AI device 100 as described above with reference to FIGS. 5 and 6.

When the AI device 100 refers to a vehicle, the AI device 100 refers to itself, and when the AI device 100 is a component separate from the vehicle, the AI device 100 may be device that is installed in the vehicle and controls the vehicle or assists a function of the vehicle.

Hereinafter, a vehicle controlled by the AI device 100 will be referred to as a vehicle or an AI vehicle irrespective of that the AI device 100 is itself or is a separate component from the AI device 100. That is, the vehicle may indicate the AI device 100 itself.

Figure 7:
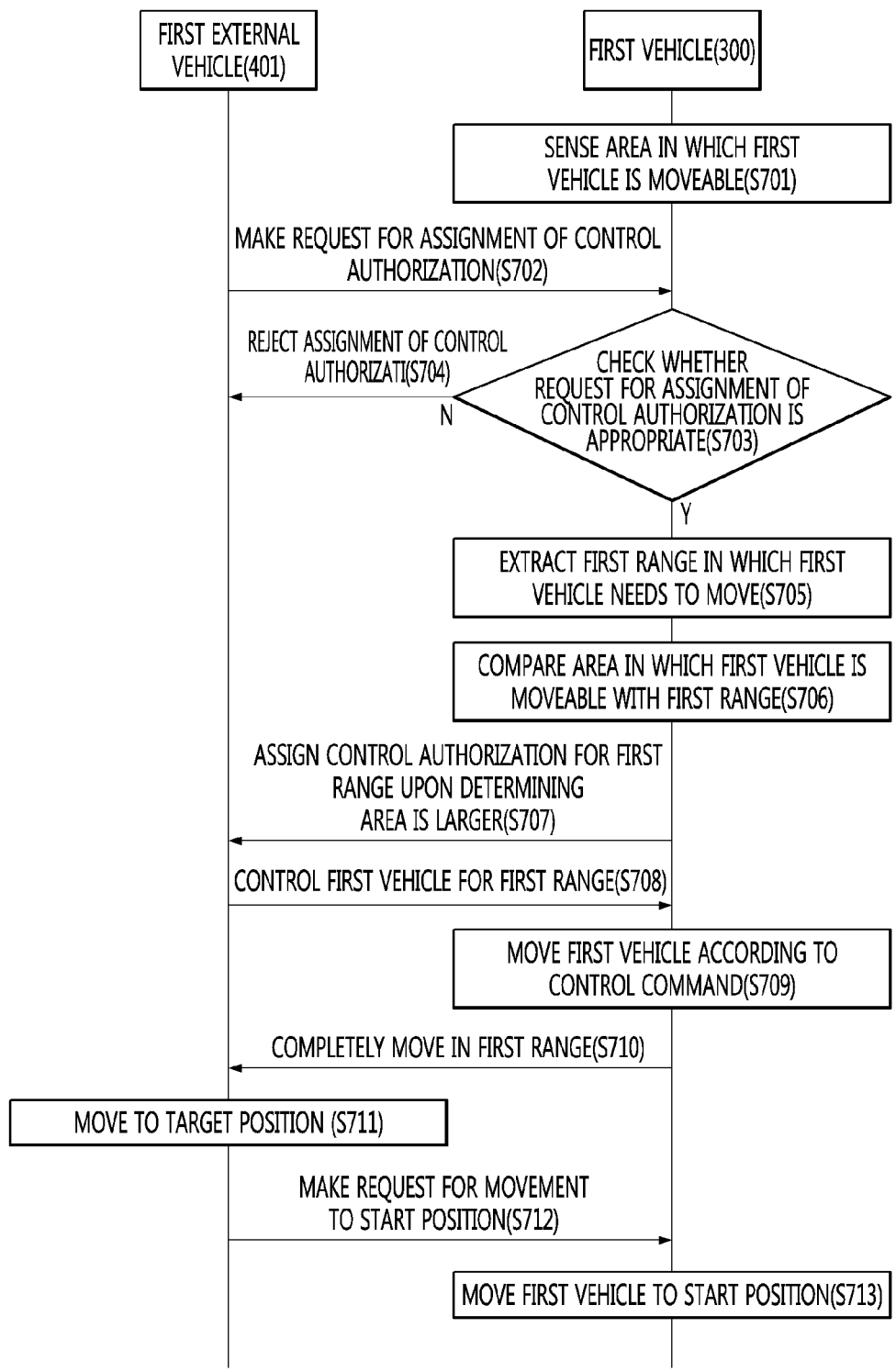
FIG. 7 is a flowchart showing an operation of processing a request for assignment of control authorization of an external vehicle by the AI device 100 according to an embodiment of the present invention.

FIG. 7 is a flowchart showing an operation of processing a request for assignment of control authorization of the first external vehicle 401 by the AI device 100 installed in the first vehicle 300 according to an embodiment of the present invention.

Referring to FIG. 7, the sensing unit 140 of the AI device 100 may sense an area in which the first vehicle 300 is moveable at a current position (S701). The sensing unit 140 may sense an area in a predetermined range in which the first vehicle 300 is moveable without collision based on shape information, and position and surrounding environment information of the first vehicle 300 using various sensors.

The processor 180 may identify an area in which the first vehicle 300 is not moveable based on the sensed area in which the first vehicle 300 is moveable and may determine whether the area in which the first vehicle 300 is not moveable is caused by an external vehicle. For example, the processor 180 may communicate with external vehicles positioned in the area in which the first vehicle 300 is not moveable using the communication unit 110 and may identify an external vehicle positioned within the area in which the first vehicle 300 is not moveable. The processor 180 may perform communication between external vehicles using an invisible ray frequency and a communication protocol through the communication unit 110 and may perform V2X communication. The processor 180 may directly communicate with an external vehicle through the communication unit 110 and may receive traveling information such as a position or speed of a corresponding vehicle from an external vehicle.

The processor 180 may receive a request for assignment of control authorization from the first external vehicle 401 (S702). In this case, information on the request for assignment of control authorization may be recorded in a block chain. In this case, the processor 180 may receive at least one of information on a moving plan path or information on a target position to which the first vehicle 300 intends to be moved, from the first vehicle 300.

The processor 180 may check whether the request for assignment of control authorization of the first external vehicle 401 is appropriate (S703). When the first external vehicle 401 moves to a target destination position, the processor 180 may determine whether the first external vehicle 401 collides with the first vehicle 300 at a current position. For example, whether collision occurs may be determined based on the moving plan path or the target position of the first external vehicle 401 and the current position of the first vehicle 300.

When the first external vehicle 401 moves to the target position, if the processor 180 determines that the first external vehicle 401 collides with the first vehicle 300 at a current position, the processor 180 may determine that the request for assignment of control authorization of the first external vehicle 401 is appropriate and may assign control authorization for the first vehicle 300 to the first external vehicle 401. In addition, even if the first external vehicle 401 moves the target position, if the processor 180 determines that the first external vehicle 401 does not collide with the first vehicle 300 at a current position, the processor 180 may reject the request for assignment of control authorization of the first external vehicle 401 (S704). In this case, information on rejection on assignment of control authorization may be recorded in a block chain. Accordingly, damage due to the inappropriate request for control authorization may be prevented in advance.

The processor 180 may receive a request for assignment of control authorization for a first range in which the first vehicle 300 needs to move for enabling the first external vehicle 401 to move to a target position without collision with the first vehicle 300, from the first external vehicle 401. Upon receiving a request for assignment of control authorization from the first external vehicle 401, the processor 180 may process the request for assignment of control authorization that is limited only to control authorization for the first range in which the first vehicle 300 needs to move, but not inclusive control of the first vehicle 300. Here, the first range may be a range in which the first vehicle 300 needs to move for enabling the first external vehicle 401 to move to the target position without collision with the first vehicle 300.

The processor 180 may extract the first range in which the first vehicle 300 needs to move (S705). In this case, the processor 180 may extract the first range based on at least one of information sensed through the sensing unit 140, or a moving plan path and target position received from the first external vehicle 401. The processor 180 may extract a minimum range in which the first vehicle 300 needs to move for enabling the first external vehicle 401 to move to the target position without collision with the first vehicle 300, as the first range. The processor 180 may limit and extract the first range to a predetermined range. For example, the processor 180 may extract a position closest to the current position of the first vehicle 300 or a preset number of positions, as the first range, when the first vehicle 300 can be positioned at a plurality of positions in the first range. The processor 180 may extract at least one position within the area in which the first vehicle 300 is moveable at the current position, as the first range, when the first vehicle 300 is positioned at a plurality of positions in the first range.

The processor 180 may compare the area in which the first vehicle 300 is moveable with the first range (S706). For example, the processor 180 may acquire information on the area in which the first vehicle 300 is moveable and information on the first range in which the first vehicle 300 needs to move, based on the information sensed by the sensing unit 140, and may perform comparison to determine whether the area in the first range is included in the area in which the first vehicle 300 is moveable.

Upon determining that the area in which the first vehicle 300 is moveable is larger than the first range in which the first vehicle 300 needs to move, the processor 180 may assign control authorization for the first range to the first external vehicle (S707). Limited control authorization for moving only in the first range may be assigned, and thus accidents may be prevented in advance. Here, when the area in which the first vehicle 300 is moveable is determined to be larger than the first range in which the first vehicle 300 needs to move, this means that the first range in which the first vehicle 300 needs to move is included in the area in which the first vehicle 300 is moveable and the first vehicle 300 is positioned in the area, in which the first vehicle 300 needs to move, including the first range.

When the area in which the first vehicle 300 is moveable includes the entire first range in which the first vehicle 300 needs to move, the processor 180 may assign control authorization for the first range to the first external vehicle 401. When the area in which the first vehicle 300 is moveable includes a partial portion of the first range in which the first vehicle 300 needs to move, if the first vehicle 300 is capable of moving in the partial first range included in the area in which the first vehicle 300 is moveable, the processor 180 may also assign control authorization for the first range limited to the area in which the first vehicle 300 is moveable to the first external vehicle 401.

When assigning control authorization to the first external vehicle 401, the processor 180 may receive a control command for the first external vehicle 401 from the first external vehicle 401 and may move the first vehicle 300 according to the received control command.

The processor 180 may receive the control command for the first vehicle 300 in the first range, from the first external vehicle 401 (S708). The processor 180 may move the first vehicle 300 according to the control command received from the first vehicle 300 (S709).

When the area in which the first vehicle 300 is moveable is changed according to control of the first external vehicle 401 for the first vehicle 300, the processor 180 may perform an operation of comparing the changed area with the first range. Accordingly, change in a surrounding environment of the first vehicle 300 according to control of the first external vehicle 401 may be applied to update a range of control authorization assigned to the first external vehicle 401.

When movement in the first range is completed according to control of the first vehicle 300, the processor 180 may notify the first external vehicle 401 of information indicating that movement in the first range is completed (S710).

The processor 180 may also determine that the first external vehicle 401 completely moves in the first range based on position information of the first vehicle 300.

When the first vehicle 300 completely moves in the first range, the first external vehicle 401 may move to the target position (S711). Accordingly, the first external vehicle 401 may control the first vehicle 300 that blocks a moving path to the target position to ensure a space and may move to the target position.

The processor 180 may recognize a position of the first external vehicle 401 and may determine that the first external vehicle 401 moves to the target position.

The processor 180 may receive a request for movement to a start position from the first external vehicle 401 (S712) and may determine movement to the target position based on position information.

When the first external vehicle 401 moves to the target position, the processor 180 may move the first vehicle to the start position of the first vehicle 300 at a time point when control by the first external vehicle 401 begins.

When the first external vehicle 401 moves to the target position, the processor 180 may move the first vehicle to a start position of the first vehicle 300 at a time point when control by the first external vehicle 401 begins (S713).

The processor 180 may also move the first vehicle to the start position of the first vehicle 300 based on the stored control command of the first external vehicle 401.

Figure 8:
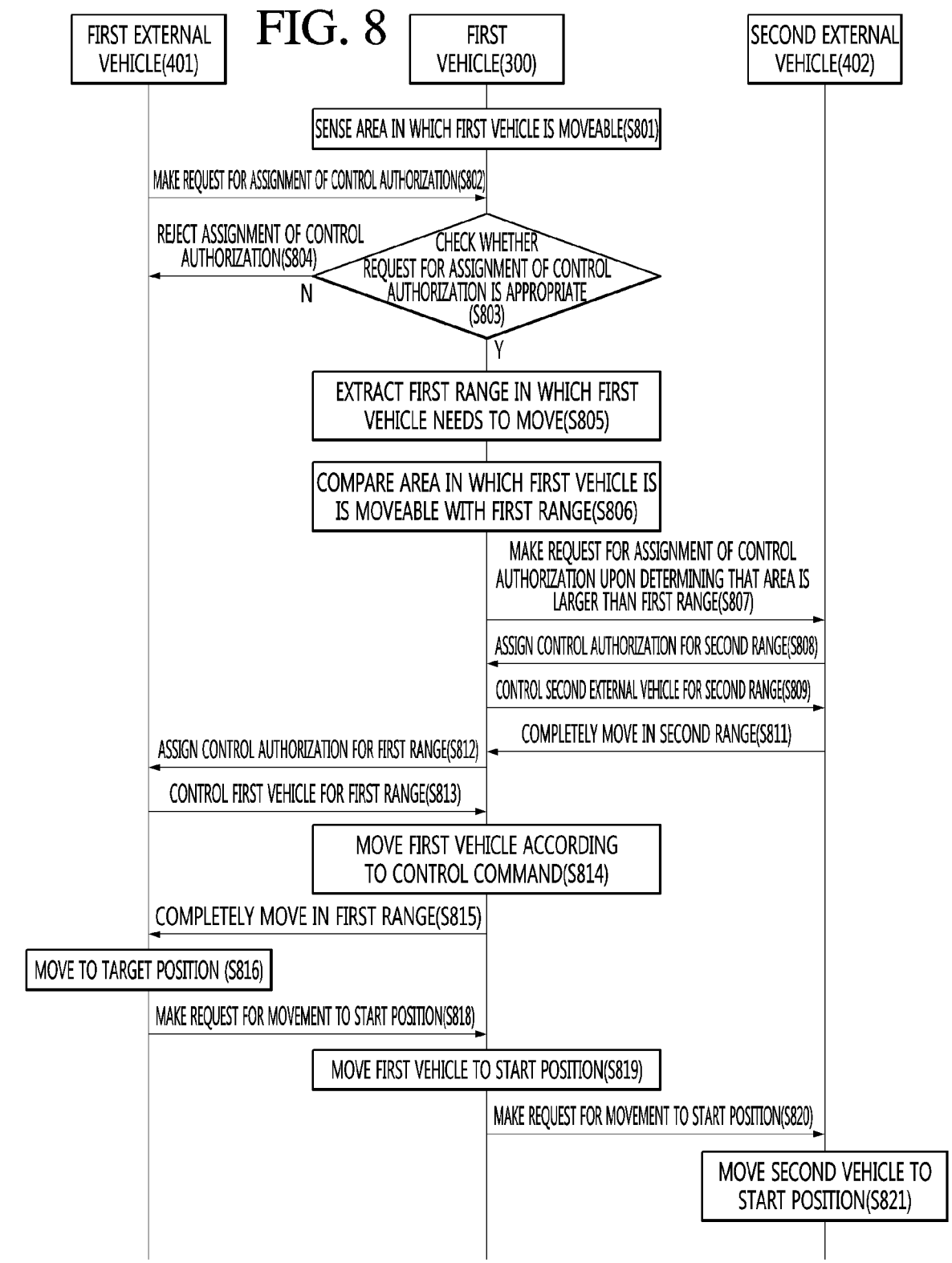
FIG. 8 is a flowchart showing an operation of processing a request for assignment of control authorization from an external vehicle by the AI device 100 according to an embodiment of the present invention.
Figure 9:
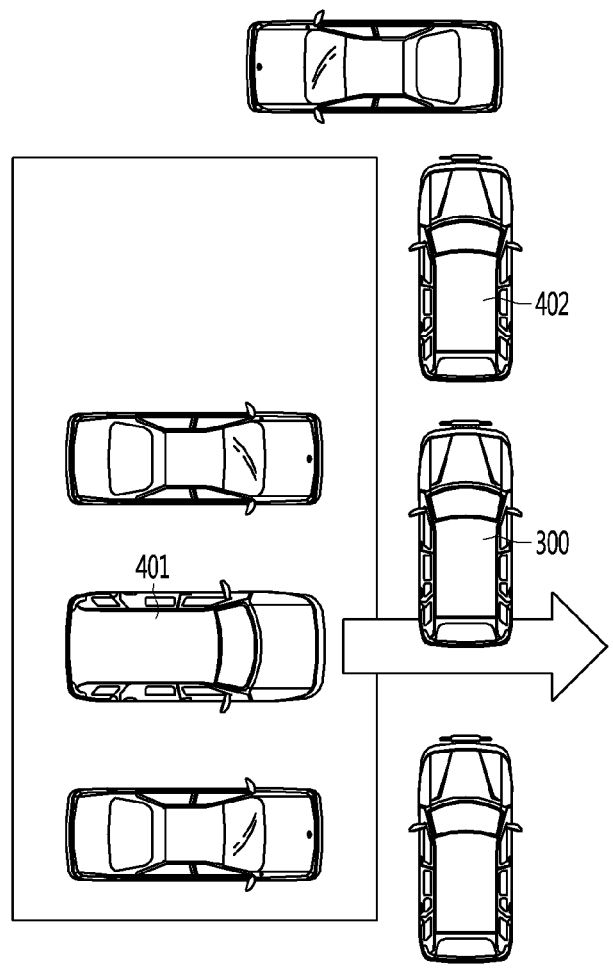
FIGS. 9 to 12 are diagrams showing movement of a vehicle according to a request for serial control authorization by the AI device 100 according to an embodiment of the present invention.
Figure 10:
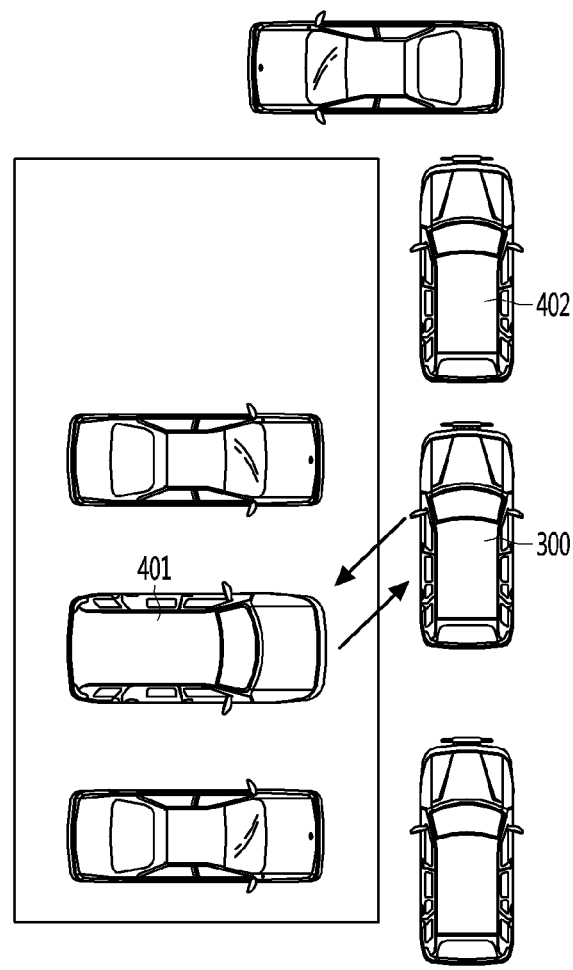
Figure 11:
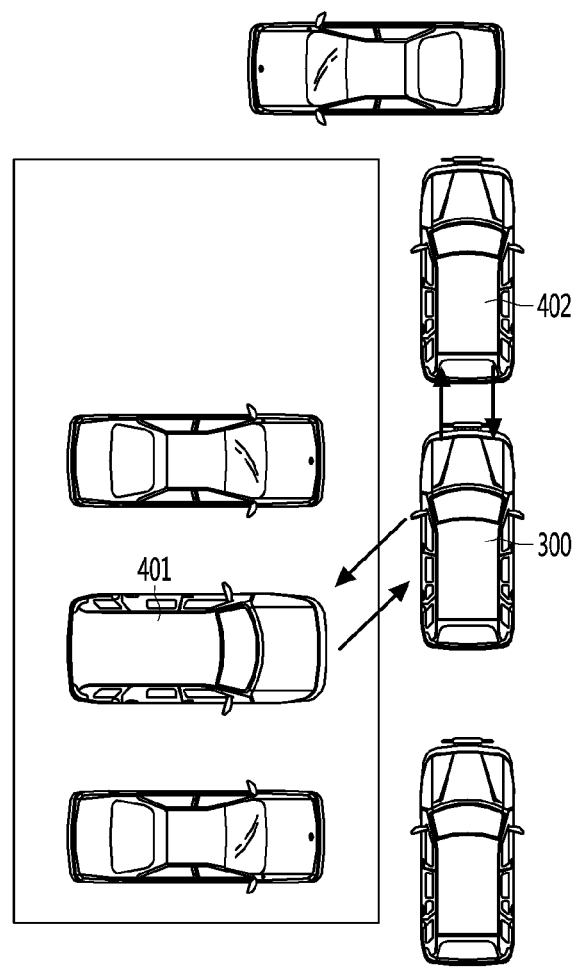
Figure 12:
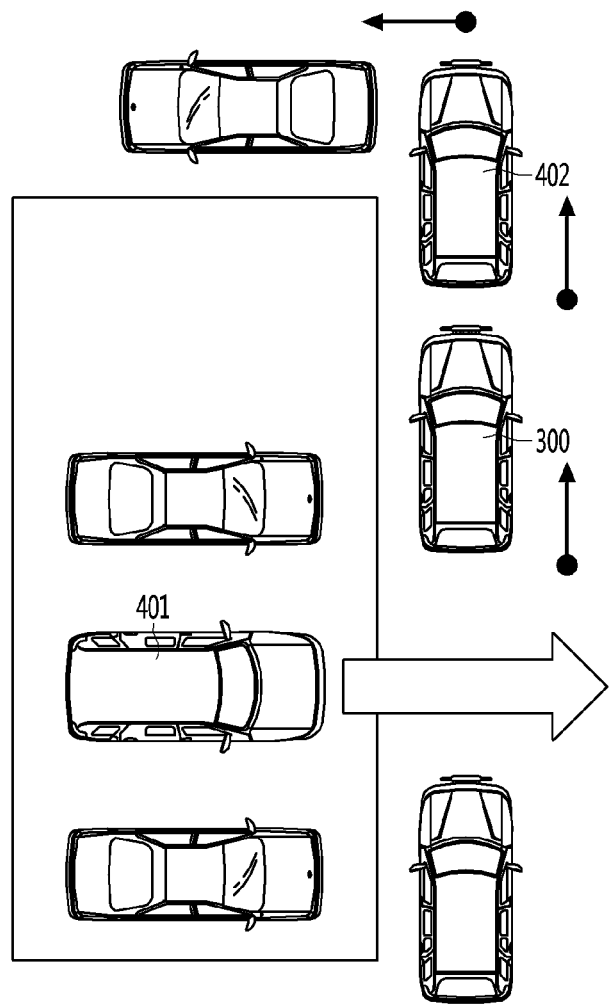

FIG. 8 is a flowchart showing an operation of processing a request for assignment of control authorization from the first external vehicle 401 by the AI device 100 according to an embodiment of the present invention. With regard to a description of operations of FIG. 8, a repeated description compared with FIG. 7 is omitted.

The sensing unit 140 of the AI device 100 may sense an area in which the first vehicle is moveable at a current position of the sensing unit 140 (S801).

The processor 180 may identify an area in which the first vehicle 300 is not moveable based on the sensed area in which the first vehicle is moveable and may determine whether the area in which the first vehicle is not moveable is caused by the second external vehicle 402.

The processor 180 may receive a request for assignment of control authorization from the first external vehicle 401 (S802). In addition, the processor 180 may check whether the request for assignment of control authorization of the first external vehicle 401 is appropriate (S803). The processor 180 may reject the request for assignment of control authorization of the first external vehicle 401 (S804). The processor 180 may extract the first range in which the first vehicle 300 needs to move (S805). The processor 180 may compare the area in which the first vehicle 300 is moveable with the first range (S806).

Upon determining that the area in which the first vehicle 300 is moveable is smaller than the first range in which the first vehicle 300 needs to move, the processor 180 may make a request to the second external vehicle 402 for control authorization for allowing the first vehicle 300 to control the second external vehicle 402 (S807).

Upon determining that the area in which the first vehicle 300 is moveable is smaller than the first range in which the first vehicle 300 needs to move, the processor 180 may make a request to the second external vehicle 402 for control authorization for the second range in which the second external vehicle needs to move for enabling the first vehicle 300 to move by the first range without collision with the second external vehicle 402.

Here, when the area in which the first vehicle 300 is moveable is determined to be smaller than the first range in which the first vehicle 300 needs to move, this means that the first range in which the first vehicle 300 needs to move is not included in the area in which the first vehicle 300 is moveable or the first vehicle 300 is not capable of being positioned in the area including the first range even if the first range is included in the area.

The processor 180 may make a request to the second external vehicle 402 for control authorization for allowing the AI device 100 to control the second external vehicle 402.

The processor 180 may make a request to the second external vehicle 402 for control authorization for allowing the AI device 100 to control the second external vehicle 402 based on information sensed by the sensing unit 140.

The processor 180 may receive assignment of control authorization for the second range from the second external vehicle 402 (S808).

The processor 180 may control the second external vehicle for the second range (S809).

The second external vehicle 402 may move according to the control command of the first vehicle (S810).

The processor 180 may receive notification indicating that the second external vehicle 402 completely moves to the second range (S811).

The processor 180 may also determine that the second external vehicle 402 completely moves in the first range based on position information of the second external vehicle 402.

The processor 180 may receive assignment of control authorization from the second external vehicle 402, may control the second external vehicle 402 to move by the second range, and may assign control authorization for the first range to the first external vehicle 401 (S812).

The processor 180 may receive a control command for the first vehicle 300 for the first range from the first external vehicle 401 (S813).

The processor 180 may move the first vehicle 300 according to the control command received from the vehicle 300 (S814).

When movement in the first range is completed according to control of the first vehicle 300, the processor 180 may notify the first external vehicle 401 of information indicating that movement in the first range is completed (S815).

When the first vehicle 300 completely moves in the first range, the first external vehicle 401 may move to the target position (S816).

When the first external vehicle 401 moves to the target position, the processor 180 may move the first vehicle to the start position of the first vehicle 300 at a time point when control by the first external vehicle 401 begins (S818 and S819).

When the first vehicle 300 moves to a start position of the first vehicle 300, the processor 180 may make a request to the second external vehicle 402 for original position movement to a start position of the second external vehicle 402 at a time point when control by the first vehicle 300 begins (S821).

FIGS. 9 to 12 are diagrams showing a procedure of ensuring a vehicle movement space according to assignment of serial control authorization of the AI device 100 by the first external vehicle 401, the second external vehicle 402, and the first vehicle 300 according to an embodiment of the present invention. The procedure of FIGS. 9 to 12 is performed by the components described with reference to FIGS. 1 to 6 and a procedure for corresponding operations has been described above with reference to FIGS. 7 to 8, and thus a repeated description is omitted.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

According to various embodiments of the present invention, an area in which a vehicle is moveable may be sensed, a request for assignment of control authorization of an external vehicle may be processed based on the area, and the external vehicle may be allowed to move to a target position, and thus even if a moving path is blocked by stationary vehicles, an autonomous vehicle may ensure a space and may move.

According to various embodiments of the present invention, when a road is blocked by other vehicles in a parking lot in which vehicles are dense, a vehicle may ensure a moving space and may move through serial requests for control authorization for surrounding stationary vehicles.

According to various embodiments of the present invention, limited control authorization may be assigned to prevent accidents in advance in an incident dangerous situation.

According to various embodiments of the present invention, a request for assignment of control authorization, assignment of control authorization, and vehicle movement under control may be recorded, thereby finding the cause and responsibility of the accident.

What is claimed is:

1. An artificial intelligence (AI) device installed in a first vehicle, comprising:
a sensor; and
a processor,
wherein the processor of the AI device installed in the first vehicle is configured to:
control the sensor to sense an area within which the first vehicle is moveable;
receive, from a first external vehicle, a request for an assignment of a first control authorization for allowing the first external vehicle to control the first vehicle in order to enable the first external vehicle to move to a first external vehicle target position without colliding with the first vehicle;
determine whether or not the request for the assignment of the first control authorization is required to prevent the first external vehicle from colliding with the first vehicle when moving the first external vehicle to the first external vehicle target position;
upon determining that the request for the assignment of the first control authorization is not required to prevent the first external vehicle from colliding with the first vehicle when moving the first external vehicle to the first external vehicle target position, sending a message to the first external vehicle that denies the assignment of the first control authorization;
upon determining that the request for the assignment of the first control authorization is required to prevent the first external vehicle from colliding with the first vehicle when moving the first external vehicle to the first external vehicle target position, extract a first range from the sensed area within which the first vehicle needs to move in order to enable the first external vehicle to move to the first external vehicle target position without colliding with the first vehicle;
perform a comparison of the sensed area to the first range;
based on the comparison resulting in a determination that the first vehicle could move in the first range in response to the request for the assignment of the first control authorization, but that the first vehicle cannot move in the first range due to a presence of a second external vehicle that impedes movement of the first vehicle in the first range, make a request to the second external vehicle for an assignment of a second control authorization for a second range in which the second external vehicle needs to move in order to enable the first vehicle to move within the first range in response to the request for the assignment of the first control authorization without colliding with the second external vehicle;

receive the assignment of the second control authorization from the second external vehicle;

based on the assignment of the second control authorization, control the second external vehicle to move within from a second external vehicle start position to a second external vehicle target position within the second range, so as to enable the first vehicle to move from a first vehicle start position to a first vehicle target position within the first range without colliding with the second external vehicle;

receive a first move completion report from the second external vehicle;

based on the first move completion report from the second external vehicle, assign the first control authorization to the first external vehicle, wherein the first control authorization limits movement of the first vehicle to only be within the first range;

in response to the assignment of the first control authorization to the first external vehicle, receive a movement command from the first external vehicle;

based on the movement command, move the first vehicle from the first vehicle start position to the first vehicle target position within the first range;

upon moving the first vehicle to the first vehicle target position within the first range, send a second move completion report to the first external vehicle so as to enable the first external vehicle to move to the first external vehicle target position;

after the first external vehicle moves to the first external vehicle target position, receive a request from the first external vehicle to move the first vehicle back to the first vehicle start position;

based on the request from the first external vehicle to move the first vehicle back to the first vehicle start position, move the first vehicle back to the first vehicle start position; and upon returning the first vehicle back to the first vehicle start position, transmit a request to the second external vehicle to move the second external vehicle back to the second external vehicle start position.

2. The AI device of claim 1, wherein the processor is further configured to assign the first control authorization to the first external vehicle based on a determination by the processor that the first external vehicle is set to collide with the first vehicle when moving to the first external vehicle target position from the first external vehicle start position.

3. The AI device of claim 1, wherein the processor is further configured to move the first vehicle from the first vehicle start position to the first vehicle target position at a time point determined by the processor.

4. The AI device of claim 1, wherein the processor is further configured to make the request to the second external vehicle for the assignment of the second control authorization at a time point determined by the processor.

5. A vehicle control method performed by an artificial intelligence (AI) device installed in a first vehicle, the method performed by the AI installed in the first vehicle and comprising:

sensing an area within which the first vehicle is moveable;

receive, from a first external vehicle, a request for an assignment of a first control authorization for allowing the first external vehicle to control the first vehicle in order to enable the first external vehicle to move to a first external vehicle target position without colliding with the first vehicle;

determine whether or not the request for the assignment of the first control authorization is required to prevent the first external vehicle from colliding with the first vehicle when moving the first external vehicle to the first external vehicle target position;

upon determining that the request for the assignment of the first control authorization is not required to prevent the first external vehicle from colliding with the first vehicle when moving the first external vehicle to the first external vehicle target position, sending a message to the first external vehicle that denies the assignment of the first control authorization;

upon determining that the request for the assignment of the first control authorization is required to prevent the first external vehicle from colliding with the first vehicle when moving the first external vehicle to the first external vehicle target position, extract a first range from the sensed area within which the first vehicle needs to move in order to enable the first external vehicle to move to the first external vehicle target position without colliding with the first vehicle;

perform a comparison of the sensed area to the first range;

based on the comparison resulting in a determination that the first vehicle could move in the first range in response to the request for the assignment of the first control authorization, but that the first vehicle cannot move in the first range due to a presence of a second external vehicle that impedes movement of the first vehicle in the first range, make a request to the second external vehicle for an assignment of a second control authorization for a second range in which the second external vehicle needs to move in order to enable the first vehicle to move within the first range in response to the request for the assignment of the first control authorization without colliding with the second external vehicle;

receive the assignment of the second control authorization from the second external vehicle;

based on the assignment of the second control authorization, control the second external vehicle to move within from a second external vehicle start position to a second external vehicle target position within the second range, so as to enable the first vehicle to move from a first vehicle start position to a first vehicle target position within the first range without colliding with the second external vehicle;

receive a first move completion report from the second external vehicle;

based on the first move completion report from the second external vehicle, assign the first control authorization to the first external vehicle, wherein the first control authorization limits movement of the first vehicle to only be within the first range;

in response to the assignment of the first control authorization to the first external vehicle, receive a movement command from the first external vehicle;

based on the movement command, move the first vehicle from the first vehicle start position to the first vehicle target position within the first range;

upon moving the first vehicle to the first vehicle target position within the first range, send a second move completion report to the first external vehicle so as to enable the first external vehicle to move to the first external vehicle target position;

after the first external vehicle moves to the first external vehicle target position, receive a request from the first external vehicle to move the first vehicle back to the first vehicle start position;

based on the request from the first external vehicle to move the first vehicle back to the first vehicle start position, move the first vehicle back to the first vehicle start position; and upon returning the first vehicle back to the first vehicle start position, transmit a request to the second external vehicle to move the second external vehicle back to the second external vehicle start position.

6. The vehicle control method of claim 5, further comprising:

assigning the first control authorization to the first external vehicle based on a determination by the first vehicle that the first external vehicle is set to collide with the first vehicle when moving to the first external vehicle target position from the first external vehicle start position.

7. The vehicle control method of claim 5, further comprising:

moving the first vehicle from the first vehicle start position to the first vehicle target position at a determined time point.

8. The vehicle control method of claim 5, further comprising:

making the request to the second external vehicle for the assignment of the second control authorization at a determined time point.

* * * * *